(No Model.)  
2 Sheets—Sheet 1.

H. REINHOLD.
BED BOTTOM.

No. 471,622. Patented Mar. 29, 1892.

Witnesses:
Arthur Ashley
Otto Luebbert

Inventor:
Hermann Reinhold
By Fitz Kennedy
atty.

(No Model.) 2 Sheets—Sheet 2.
H. REINHOLD.
BED BOTTOM.
No. 471,622. Patented Mar. 29, 1892.
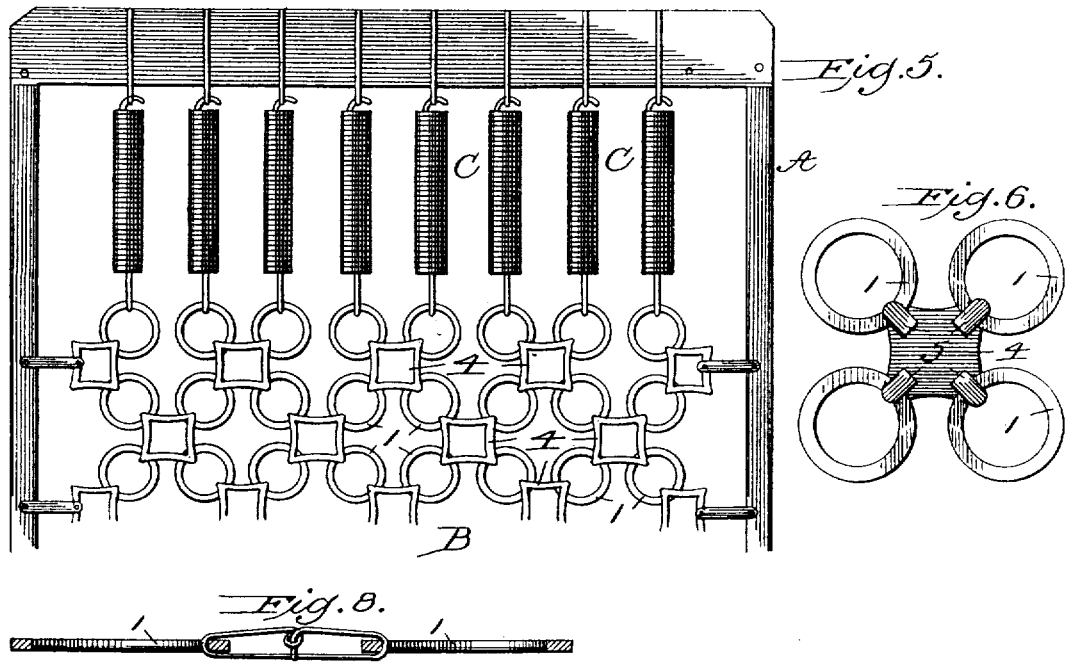
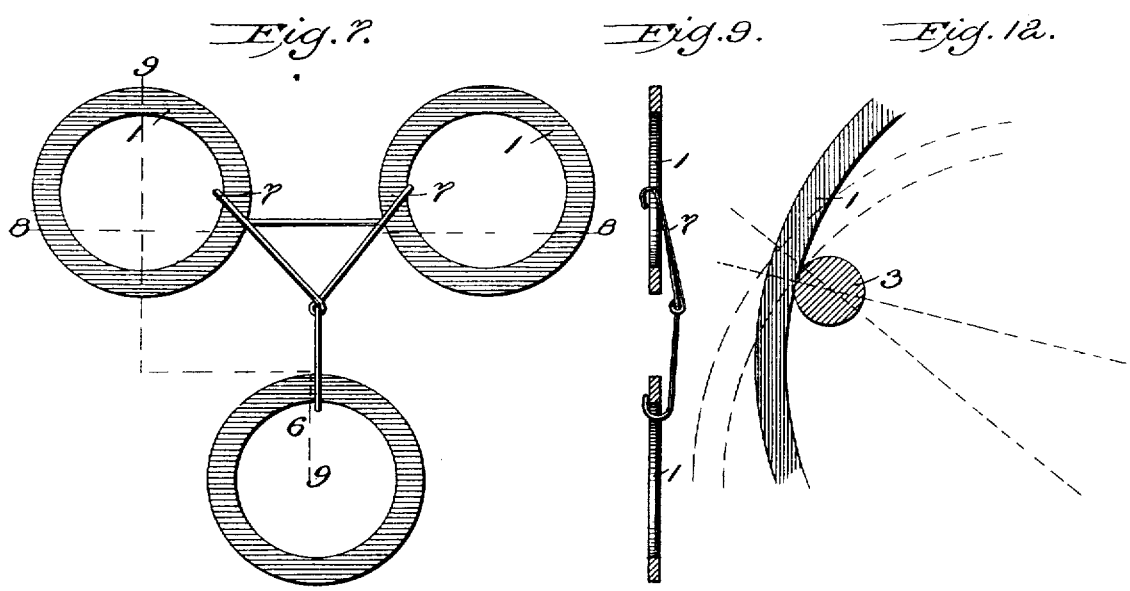
Witnesses:
Arthur Ashley
Otto Lubbert
Inventor:
Hermann Reinhold
By Fotz Kennedy
atty.

UNITED STATES PATENT OFFICE.

HERMANN REINHOLD, OF BERLIN, GERMANY.

BED-BOTTOM.

SPECIFICATION forming part of Letters Patent No. 471,622, dated March 29, 1892.

Application filed June 5, 1891. Serial No. 395,278. (No model.)

*To all whom it may concern:*

Be it known that I, HERMANN REINHOLD, a subject of the Emperor of Germany, residing at Berlin, in the Kingdom of Prussia and Empire of Germany, have invented certain new and useful Improvements in Mattresses, of which the following is a specification, reference being had therein to the accompanying drawings.

This invention relates to a novel construction in mattresses, and more particularly to mattresses or elastic bed-bottoms formed of suitable netting and upon which the mattress-bolster is placed.

The objects of my invention are to provide a device of this character of simple, durable, and inexpensive construction and to provide a mattress of this construction that will accommodate itself to the change of location and weight of the burden imposed upon it without making a creaking or similar noise, similarly to mattresses of familiar construction.

The invention consists in the features of construction and combinations of parts hereinafter fully described and specifically claimed.

Figure 1:
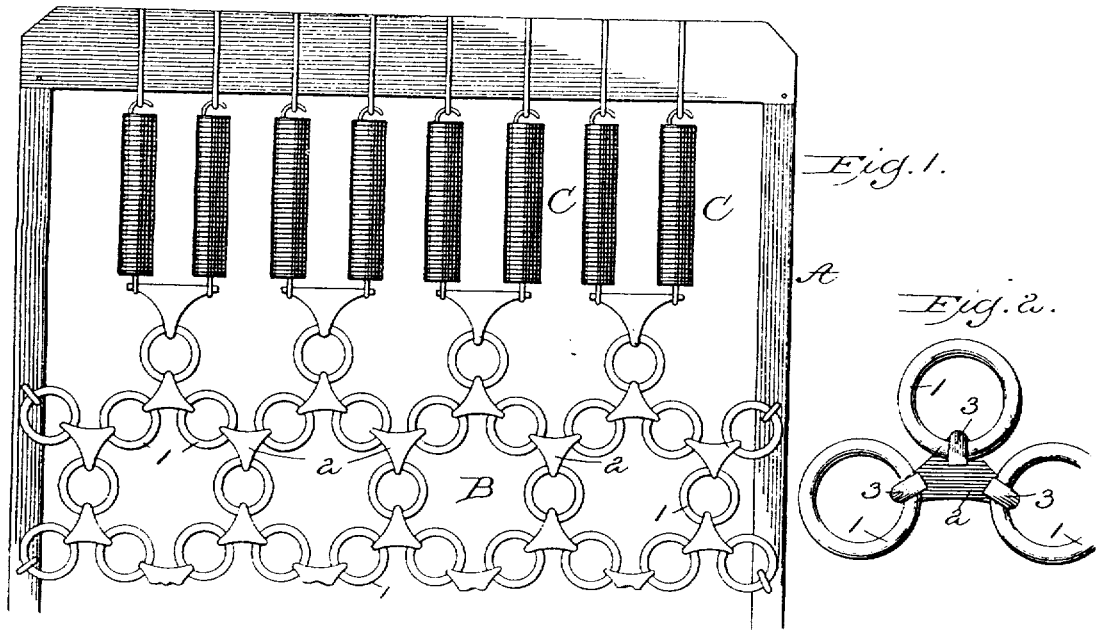
Figure 2:
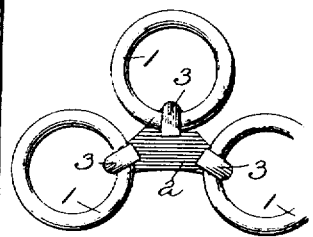
Figure 11:
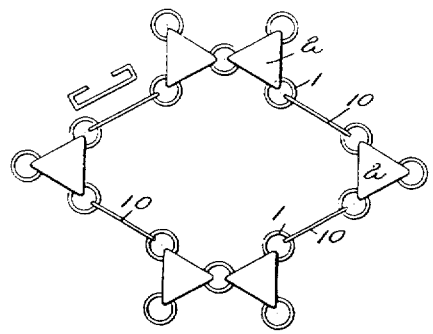
Figure 3:
Figure 4:
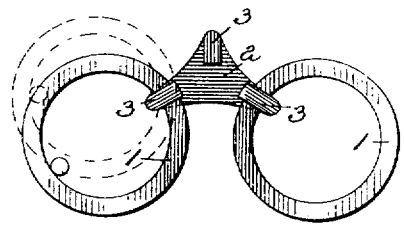
Figure 10:

In the accompanying drawings, illustrating my invention, Figure 1 is a plan view of a portion of a mattress constructed in accordance with my invention. Fig. 2 is a bottom plan view of a hook and several rings. Fig. 3 is a sectional view of the same. Fig. 4 is a plan view of a hook and rings, illustrating in dotted lines the shifting of an adjacent hook. Fig. 5 is a plan view of a mattress, showing a different form of hook. Fig. 6 is a bottom plan view of a hook and several rings of the form shown in Fig. 5. Fig. 7 is a plan view of several rings connected by a modified form of hook. Figs. 8 and 9 are sectional views taken on the lines 8 8 and 9 9 of Fig. 7, respectively. Figs. 10 and 11 show other modified forms of construction embodying my invention; and Fig. 12 illustrates, on an enlarged scale, the principle embodied in my invention.

The class of mattresses to which my invention relates have commonly been constructed with a plurality of rings that are joined together by hooked links to form a netting. In this way it will be seen that a series of pivots are formed, such pivots being located at the connecting-points of the hooks and rings. It is usual, also, to connect with each ring three or more hooks. The objection to mattresses of this construction is due to the creaking noise made by the mattress incident to placing thereon a burden or changing the location of the same. This changes the line of tension of the hooks and rings and causes a pivot or hook to shift its location on the ring with relation to the other hooks or pivots, and in changing its location on the ring the hook makes this creaking noise. To obviate this objection, I have constructed a mattress consisting of rings suitably hooked together, but so arranged that each ring is engaged by two hooks having small or narrow contact-surfaces, and the pivotal points of the hooks with a ring are located diametrically opposite, that when the location of one of the hooks changes, thereby changing the line of tension, the ring turns about its pivotal connection with said hooks noiselessly and does not slip.

Figs. 1, 2, 3, and 4 of the drawings illustrate an embodiment of my invention. A indicates the frame of a mattress, and B indicates as a whole the mattress suitably secured to said frame by springs C in the usual manner. The mattress or netting B consists of a series of rings 1 and hook-plates 2. The hook-plates 2 are provided with a plurality of hooks 3, (in the instance illustrated each plate being provided with three hooks,) that engage the rings, and thus form the mattress. The rings and hooks are so located and arranged that each ring is engaged by two hooks only, and said hooks are diametrically opposite and form in effect pivots that are located in the line of tension.

To illustrate the manner in which the mattress is made to accommodate itself to various burdens, I have shown in Fig. 4 in dotted lines one of the rings whose position has been changed on account of a change in the direction of the tension. The pivot or hook is moved from one position to another and carries with it the ring, which ring also turns upon its other hook as a pivot in an obvious manner. In Fig. 12 is shown, on an enlarged scale, a portion of one of the rings and a section of a hook or pivot. The ring is also shown in dotted lines in its changed position and illustrates the manner in which the said ring changes its position and turns upon said pivot without slipping.

In Figs. 5 and 6 is shown a slightly-modified form of construction. In this construction the hook-plates 4 are provided with four hooks 5. The arrangement of the rings 1 and the hook-plates 4 is such, however, that each ring is only engaged by two hooks 5 in the manner heretofore described.

In Figs. 7, 8, and 9 is shown another modification. In this construction, instead of hook-plates, the rings are connected by a wire suitably bent to form a hook 6 and two loops 7, that engage said rings.

In Fig. 10 is shown another construction of wire connection between the rings, and comprises a wire bent at its end portions to form the hooks 8 and having an intermediate connecting portion 9 between said hooked end portions.

It is not essential that hook-plates having three or more hooks should be employed, as an ordinary link 10 can be employed in combination with such hook-plates, as shown in Fig. 11, so long as the arrangement of two hooks or a link and hook only engaging each ring is preserved for the reasons hereinbefore set forth.

In all the instances shown the hooks that engage with the rings have a small or narrow bearing or contact surface that is formed by making the hook cylindrical, so that there is only a point of contact between the said rings and hooks. It will thus be seen that no matter what the relative positions of the rings and hooks may be by reason of the strain to which they are subjected there will be no shifting of the contact-point but that the said rings will only turn noiselessly upon said hooks as pivots.

I claim as my invention—

1. A mattress comprising a plurality of rings connected together by a plurality of hooks having small and narrow bearing-surfaces, each of said rings being engaged by only two of said hooks, substantially as described.

2. A mattress comprising a plurality of rings and a plurality of hook-plates having three or more hooks provided with small or narrow bearing-surfaces, each of said rings being engaged by only two of said hooks, substantially as described.

In testimony whereof I affix my signature in presence of two witnesses.

HERMANN REINHOLD.

Witnesses:
 ULRICH R. MAERZ,
 GUSTAV KORYTOWSKI.